United States Patent [19]
Solomon et al.

[11] Patent Number: 5,768,545
[45] Date of Patent: Jun. 16, 1998

[54] COLLECT ALL TRANSFERS BUFFERING MECHANISM UTILIZING PASSIVE RELEASE FOR A MULTIPLE BUS ENVIRONMENT

[75] Inventors: Gary Solomon, Hillsboro, Oreg.; Jeff Rabe, Rancho Cordoya; Darren Abramson, Folsom, both of Calif.

[73] Assignee: Intel Corporation, Santa Clara, Calif.

[21] Appl. No.: 661,438

[22] Filed: Jun. 11, 1996

[51] Int. Cl.$^6$ .............................. G06F 13/00; G06F 13/38
[52] U.S. Cl. ............................................. 395/306; 395/842
[58] Field of Search .................................. 395/306, 308, 395/309, 822, 842; 370/401, 402

[56] References Cited

U.S. PATENT DOCUMENTS

| | | | |
|---|---|---|---|
| 5,581,714 | 12/1996 | Amini et al. | 395/308 |
| 5,606,672 | 2/1997 | Wade et al. | 395/308 |
| 5,623,697 | 4/1997 | Bland et al. | 395/842 |
| 5,630,094 | 5/1997 | Hayek et al. | 395/473 |
| 5,640,543 | 6/1997 | Farrell et al. | 395/502 |
| 5,642,489 | 6/1997 | Bland et al. | 395/308 |

*Primary Examiner*—Gopal C. Ray
*Attorney, Agent, or Firm*—Blakely, Sokoloff, Taylor & Zafman

[57] ABSTRACT

A collection buffering scheme for a computer system having agents of a pre-emptible bus and a non-pre-emptible bus. An agent of the non-pre-emptible bus, having a data width capability of N bits, when receiving a grant to write to the pre-emptible bus, writes instead to a collection buffer capable of holding a block of more than one N bit data segments. When the collection buffer is filled, the collection buffer writes the entire block of data segments over the pre-emptible bus to a CPU or memory of the computer system. Preferably, the collection buffer is filled when the block size is equal to the data width capability of the pre-emptible bus, such that a single write to the pre-emptible bus utilizes the entire capacity of pre-emptible in a given data transaction. Further, where the system has a CPU posting buffer, a system lock-up prevention negotiator is provided that drains and disables the CPU posting buffer during the data transaction.

18 Claims, 12 Drawing Sheets

COLLECT ALL TRANSFERS BUFFERING MECHANISM UTILIZING PASSIVE RELEASE FOR A MULTIPLE BUS ENVIRONMENT

BACKGROUND OF THE INVENTION

1. Field of the Invention

The present invention relates to the field of use of computer systems. More particularly, the present invention relates to management of devices on different types of buses on computer systems.

2. Description of Related Art

Pentium (A trademark of Intel Corporation) and Intel 80486™ class computer systems typically have three distinct buses, namely, a system (host) bus, a Peripheral Component Interconnect (PCI) bus and an Industry Standard Architecture (ISA) bus. The ISA bus is provided in addition to the PCI bus to handle older controller cards and devices that were designed for ISA and not for PCI which is a newer standard. For instance, though many of the newer controller cards are PCI-based, sound cards, such as the Sound-Blaster™ (a trademark of Creative Labs, Inc.), which dominate the industry are ISA based and, therefore require an ISA bus. A problem that occurs with an ISA bus (but not with PCI buses) is that once a device on the ISA bus is granted access to system memory, the device "locks" out the system including the PCI bus, the host bus, the CPU and the main memory until the ISA device (agent) has fully completed its transaction. Additionally, ISA buses have no "pre-emptibility" regarding their devices (agents) as do PCI buses, and, therefore, tasks for ISA agents cannot be interrupted and can potentially lock out the rest of the system indefinitely. The problem is enhanced in the case of record and playback of full duplex 44.1 KHz audio which have 32-bit samples for record and playback, and thereby taxes the resources of the ISA sound card with only an 8-bit or 16-bit ISA Bus attachment capability, and therefore tie up the entire system for an unacceptable period of time. Further, since the ISA bus runs at 8 MHz, transactions from the ISA bus over the PCI bus effectively run the PCI bus, as well as the memory bus, also at 8 MHz.

To solve this problem, several different solutions have been devised. Two such solutions are passive release and FDMA buffering. A Passive Release system initiates a trade-off by lowering ISA bus utilization efficiency in favor of increasing PCI bus, CPU and main memory utilization efficiency. By partitioning the data stream originating from the ISA bus into segments, wait states can be introduced between the partitioned segments such that the PCI bus, CPU and memory can, in the interim ISA bus wait states, perform other PCI, CPU and Memory operations. However, using such a solution, the total time the ISA transaction utilizes the system is still the same, and is merely distributed over a longer time interval. A different solution, known as type-F DMA or FDMA buffering, has also been developed to maximize PCI bus utilization efficiency.

In FDMA buffering, a buffer is provided such that the buffer is filled with the data stream originating from or destined for the ISA bus while other system operations are ongoing. By providing a buffer, the ISA Bus data stream flows without consuming the bandwidth of the host bus, PCI bus, CPU and main memory. The FDMA buffering scheme greatly enhances the system utilization efficiency for ISA DMA transactions. However, FDMA buffering suffers in that the scheme is proprietary and requires that the ISA agent involved in the transaction be type-F DMA capable (i.e., pre-emptible to preclude potential system lock-up) and since the scheme is new, fails to work with older ISA devices that are unaware of type-F DMA.

Thus, a solution to the ISA consumption problem is needed which approaches FDMA buffering's efficiency in order to maximize responsiveness of system resources other than those of the ISA bus. It is also desirable to remain compatible with existing ISA compatible DMA agents.

SUMMARY

In a computer system with a CPU, memory, a host bus, a pre-emptible bus (e.g. PCI) and non-pre-emptible bus (e.g. ISA) a collection buffering method and apparatus for maximizing responsiveness of other system resources during a data stream transaction of the non-pre-emptible bus. A collection buffer is provided on a bridge between the non-pre-emptible bus and pre-emptible bus. The collection buffer receives segments of a data stream from an agent on the non-pre-emptible bus in the case of a write to memory and from the memory in the case of a read of memory and a write to the agent on the non-pre-emptible bus. Once the collection buffer is full, in the case of Direct Memory Access (DMA) read operations, the entire buffer is written to memory over the pre-emptible bus. Thus, where the collection buffer has a capacity equal to the maximum data width of the pre-emptible bus, the write is performed with greater efficiency than when individually writing a small segment of the data stream from the agent of the non-pre-emptible bus at the width and speed of the non-pre-emptible bus. Prior to initiating the data stream on the non-pre-emptible bus to the collection buffer, and in response to a DMA request, a passive release semantic is signaled. The passive release semantic ensures that, prior to obtaining ownership of the system buses, the potential for system lock-up has been eliminated by draining and disabling further a CPU posting buffer.

DETAILED DESCRIPTION OF THE INVENTION

A. System-level Operation

1. Basic Features

Figure 1:
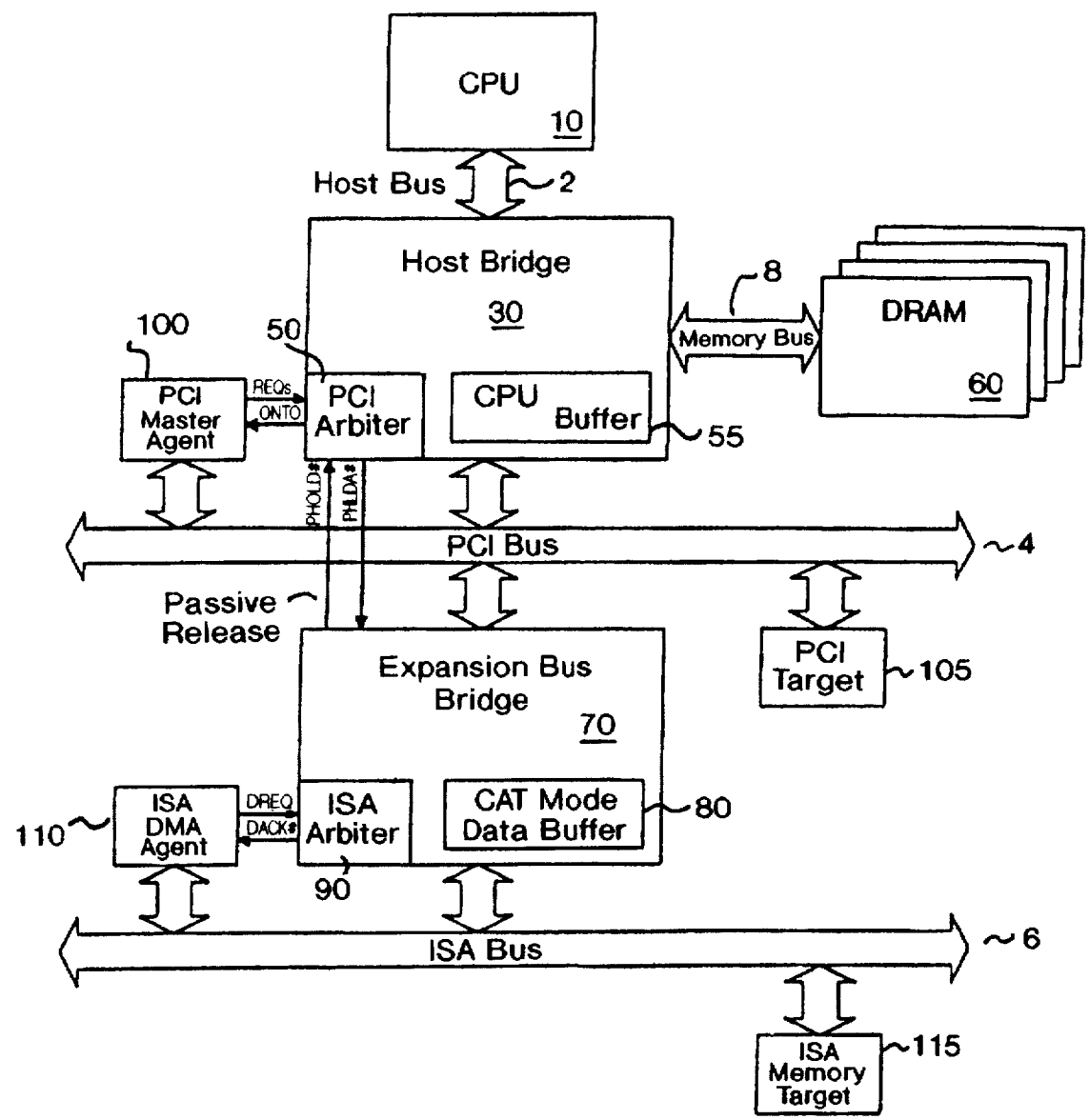
FIG. 1 is a system-level diagram of the components of the present invention.

FIG. 1 illustrates the main components of a system according to the present invention. A Central Processing Unit (CPU) 10 is provided that performs data reads and writes and executes instructions. The CPU 10 (and embodiments thereof) is well-known in the art and will not be described further as not to obscure the present invention. The CPU 10 is coupled to a host bus 2 which isolates machine-level activity from the I/O activity of an intermediate bus.

The host bus 2 is coupled to a Peripheral Component Interconnect (PCI) bus 4 through a host bridge 30. PCI bus 4 is referred to as a "pre-emptible" bus in that it can suspend the operation of an agent (device) residing on the PCI bus 4 when a higher priority operation demands use of the PCI bus 4 to access system resources. Within the host bridge 30 are two components: 1) a PCI arbiter 50, which arbitrates the use of the PCI bus 4 among agents of the PCI bus 4 and other system components, and 2) a CPU posting buffer 55 which collects data written from the CPU 10 to the PCI bus 4 for later access. Residing off of and coupled to the PCI bus 4 are a PCI Master Agent 100 and a PCI target 105.

The main memory, shown as Dynamic Random Access Memory (DRAM) 60, is coupled to the host bridge 30 through memory bus 8 which provides dynamic storage for run-time computer events. An Industry Standard Architecture (ISA) bus 6 is coupled to PCI bus 4 through an expansion bus bridge 70. ISA bus 6 is referred to as "non-pre-emptible" because when an ISA agent such as a sound card is granted access to the system, the ISA bus 6 locks out all other agents and all other buses, as well as the CPU and main memory, until the transaction for which the ISA agent was granted access has been entirely completed. This is known in the art as Guaranteed Access Timing in that the ISA agent is guaranteed system ownership for undefined periods of time with guaranteed DRAM access latency. However, there is no mechanism for bounding the time taken by an ISA DMA transaction, such that the time taken may be indefinitely long. Within expansion bus bridge 70 are two components-1) 1) an ISA arbiter 90, which arbitrates the use of ISA bus 6 among agents of ISA bus 6, and 2) a Collect All Transfers (CAT) Mode Data Buffer 80 which collects and stores data streams from ISA agents in the case of a write to memory and from across PCI bus 4 in the case of a read from memory. Residing off of ISA bus 6 is an ISA agent 110 and ISA Memory target 115.

CAT mode data buffer 80 is the focus of the present invention and will be described in an exemplary ISA memory write sequence as well as a memory read sequence.

Normally, without CAT mode data buffer 80 and without passive release, an ISA memory write sequence begins by the ISA agent 110 making an access request to the ISA arbiter 90 which resides within the expansion bus bridge 70. When the ISA arbiter 90 decides in favor of granting access to ISA agent 110, the expansion bus bridge 70 asserts a signal PHOLD# (described below) to the host bridge which initiates the flushing, disabling of the CPU posting buffer, and requests access to the PCI bus (described below) and the agent subsequently receives acknowledgment by issuance of its grant by asserting PHLDA# (described below).

PHLDA# assertion also indicates a PCI arbitration event has occurred with PCI arbiter 50, where the expansion bus bridge is the winner of arbitration. Once PCI arbiter 50 has granted access to the expansion bus bridge 70, the system is unconditionally acquired such that the PCI bus 4, host bus 2, CPU 10 and DRAM 60 are unable to transact with any other agent until ISA agent 110's transaction is complete. When the stream of data is quite voluminous, as is the case in 44.1 KHz full duplex audio (32 bit) over a SoundBlaster (8 or 16 bit) compatible agent, the system may be locked for a large amount of time, during which other operations of the system are suspended. A write to memory corresponds to recording an audio stream while a read from memory corresponds to audio playback. The period of system unresponsiveness involved in such a transaction is essentially unbounded since ISA bus 6 has no way of limiting the total size of the data stream or the transaction time.

To remedy the non-utilization problem in the system during this latency period, "Passive Release", was developed. The following description assumes an 8-bit ISA DMA agent but it will be appreciated by one skilled in the art that a 16-bit agent operates in a similar manner. In a passive release implemented system, upon initial receipt of PHLDA# but before agent 110 begins its data stream transaction and ISA 4 bus consumes the system, a semantic indicating a passive release is issued by the expansion bus bridge 70. After a passive release semantic, the PCI bus 4, host bus 2 and DRAM 60 are freed for access. This initial passive release semantic serves to ensure that the CPU posting buffer is disabled. When ISA agent 110's transaction begins, an 8-bit (1 byte) segment of data is transferred to/from the ISA agent 110 after which another passive release is signaled. All bytes transferred are thereafter each followed immediately by a passive release, freeing the PCI. Host and Memory buses. When the ISA data stream has completed (all bytes transferred), a semantic (through use of signals described below) is issued by the expansion bus bridge 70 indicating the end of the ISA data stream. By partitioning an N byte ISA data stream into N single byte segments and "passively" releasing the system between each segment, other system agents can utilize the host bus 2, PCI bus 4 and DRAM 60 between segment transfers. Passive release, during the entire ISA data stream transaction, requires however that the CPU posting buffer 55 be flushed and prevented from posting CPU to PCI memory writes, that could be targeting an ISA target agent such as ISA target 115, to prevent potential system lock-up. The semantic indicating the end of the ISA data stream is an "active release" semantic since the entire system, including CPU posting buffer 55 should now be completely freed to perform whatever operations are requested of them.

With CAT mode buffering in conjunction with passive release, as with the present invention, the data stream flows as uninterrupted one byte segments (one byte segments because in a given ISA bus cycle, ISA agent 110 transfers only 8 bits at a time) and is collected into the CAT mode buffer 80 on the expansion bus bridge 70 before it is transacted across PCI bus 4. ISA agent 110 which cannot be pre-empted will never enter a potential system lock-up because the Passive Release Protocol ensures that no CPU to PCI posted data needs to be drained to ISA until CAT mode DMA operation is complete. Further, ISA agent 110, instead of seeing a CAT mode buffer, sees the system as it would without the buffer. Thus, the CAT mode buffer is a hardware and software transparent feature which does not require that ISA agent 110 realize that it exists. The expansion bus bridge 70 intercepts the ISA byte segment of the data stream and routes it to the CAT mode buffer 80 and signals to ISA agent 110 as though the transaction is occurring over PCI bus 4. While the ISA data stream transaction is ongoing and up until CAT mode buffer 80 is filled, the host bus 2, PCI bus 4. CPU 10 and DRAM 60 are all freed to perform other transactions involving other non-ISA bus resident agents. When CAT mode buffer 80 is full and the expansion bus bridge 70 wins PCI arbitration from the PCI arbiter 50, a single 32-bit DWord (4 bytes) "burst" transfer is performed across the PCI bus 4 to DRAM 60 via host bridge 30 and memory bus 2, thus fully utilizing the 32-bit capability of PCI bus 4. If CAT mode buffer 80 is not yet full, and PCI arbiter 50 grants access to expansion bus bridge 70 (and ISA agent 110), then, another passive release semantic is issued to delay the singular 32-bit write of data over PCI bus 4 to DRAM 60 until CAT mode buffer 80 can be filled. In the case of a read by ISA agent 110 of memory (DRAM 60) over PCI bus 4, the operation of CAT mode buffering is identical except that a single DWord of (32 bit) of data is sent to bridge 70 CAT mode buffer 80 when expansion bridge 70 wins PCI arbitration and the CAT mode buffer is therefore, full. One-byte segments are then written from CAT mode buffer 80 over ISA bus 6 to ISA agent 110. A passive release semantic is issued prior to the buffered data segments being made available to ISA agent 110. Once all four bytes are written and the CAT mode buffer 80 is flushed empty, the PCI bus may pass another 32 bits (4 bytes) over to CAT mode buffer 80. While CAT mode buffer 80 is being emptied and up until the time of the next read from memory, PCI bus 4, host bus 2, CPU 10 and DRAM 60 are all freed to perform other transactions involving other non-ISA bus resident agents.

CAT mode buffering is transparent to the software and hardware in the system controlling the ISA data stream transaction, since ISA agent 110 itself is not "aware" of its existence. For systems running under Windows '95™ (a trademark of Microsoft Corp.), such transparency alleviates the problem of having to identify the buffer during its boot-up segment. Thus, whichever Direct Memory Access (DMA) channel was used without CAT mode buffering may be maintained with CAT mode buffering as well. This is contrary to the operation of FDMA buffering which requires that software running in the system recognize and have drivers to configure agents to use FDMA buffering.

The passive release system as it applies to prevention of system lock-up works in CAT mode buffering according to the present invention to also prevent system lock-up. This also enables standard ISA agents with no special attributes (as is the case for FDMA capability) to work with low system utilization.

2. System Lock-up Prevention and Pre-negotiation

Pre-negotiation for the prevention of system lock-up is another feature of the present invention. The CPU posting buffer must be drained and disabled before the DMA agent is granted the ISA bus. However, if the CPU posting buffer contains any data that is required to be written over the ISA bus to an ISA target, it cannot do so since during the transaction time of the ISA DMA agent, the ISA bus is locked out as it is currently owned by the granted ISA DMA agent which cannot be pre-empted. Thus, since the CPU posting buffer cannot be drained and the ISA agent cannot access memory until the CPU posting buffer is drained, a system lock-up condition occurs. The passive release system, prevents this system lock-up by ensuring that the CPU posting buffer cannot receive any data during the period of passive release operation and is flushed prior to the assertion of grant to the ISA agent. The passive release semantic is issued on the PCI bus prior to the start of the ISA data stream transaction and continues until the end of the ISA transaction. Thus, throughout the period of the ISA data stream transaction, a passive release permits the CPU, DRAM, host bus and PCI bus to transact with other agents. The only exception is when the CAT mode buffer must write or read CAT buffer data over the PCI bus in which case, the PCI bus is engaged. The act of signaling a Passive Release or Active Release also utilizes the system busses for a brief time (150 nanoseconds).

3. Active Release

In addition to the passive release, which releases the system before and after CAT mode buffer transactions on the PCI bus, an active release is preferably signaled after the entire ISA data stream transaction has finished. Upon an active release, the CPU posting buffer which was previously flushed and disabled during the ISA transaction period is now enabled. Further, as with passive release, the CPU, memory, host bus and PCI bus are all freed for servicing transactions by other agents. The signaling semantic for an active release is described below in section B.

B. Signaling Details

1. AT compatible ISA DMA Write Sequence

Figure 2:
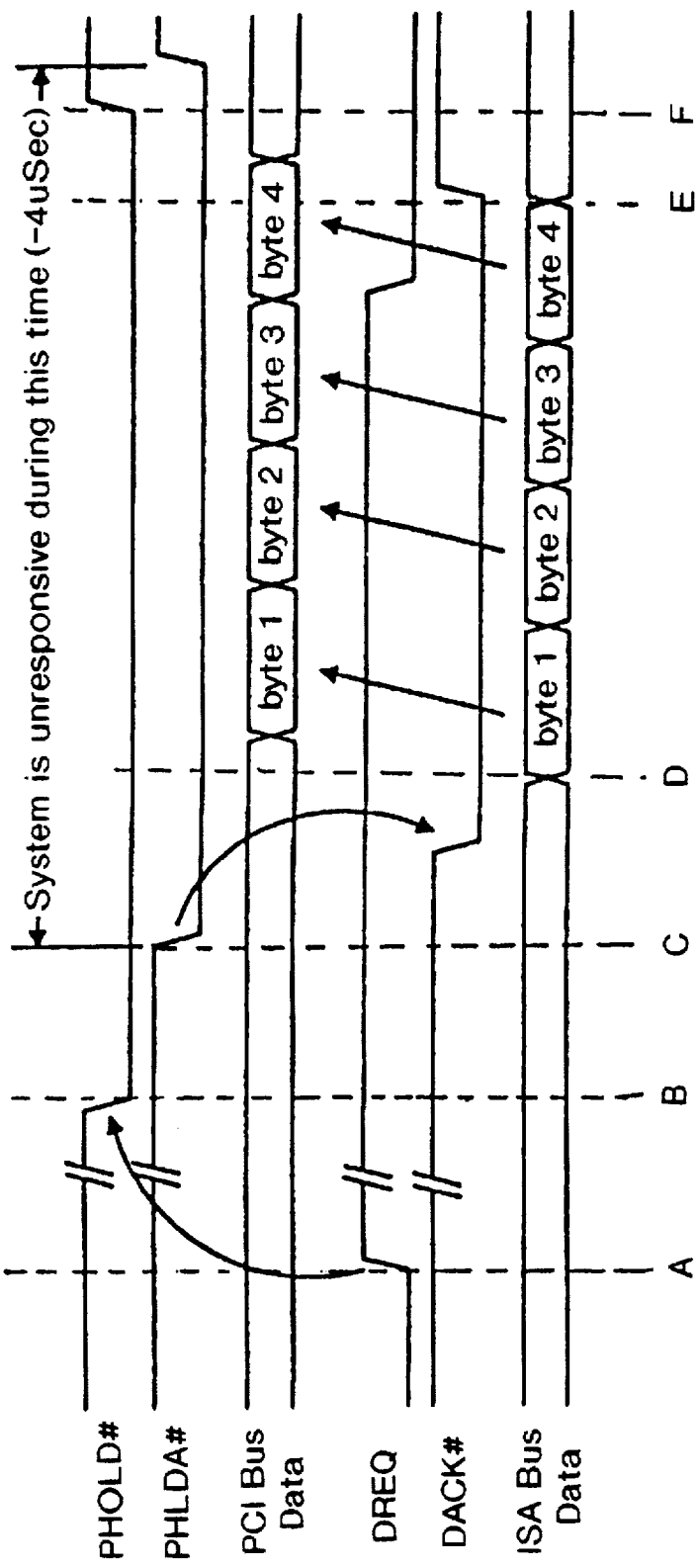
FIG. 2 shows a signal diagram of the case of a system without either passive release nor CAT mode buffering.

FIG. 2 shows a signal diagram of a DMA write in a system without passive release or CAT mode buffering in a normal "AT" compatible computer. At time index A, an ISA DMA agent asserts the signal DREQ thereby requesting a grant from the ISA arbiter. At time index B, which immediately follows time index A, (indicated by looping arrow) the signal PHOLD# is asserted by the expansion bus bridge and becomes active low. The assertion of PHOLD# is triggered by the assertion to active high of the DREQ signal. Assuming that the ISA arbiter has granted access to the ISA agent initiating the DREQ, PCI arbitration occurs from time index B to time index C until the expansion bus bridge has won a grant from the PCI arbiter.

Before time index C, the CPU posting buffer is drained and disabled to prevent a system lock-up condition. At time index C, PHLDA# is asserted (active low) to the expansion bus bridge indicating that the system is cleaned of potential lock-up and that an ISA data stream transaction can begin. The assertion of PHLDA#, whereupon the system acknowledges the right of the ISA agent to transact, immediately triggers the expansion bus bridge to assert DACK# at time index D.

As shown by FIG. 2 the assertion of PHLDA# ensures that the ISA agent is guaranteed exclusive access of all system resources and assumes that the system can perform no operation other than the ISA transaction from time index C to time index F (when the ISA stream is finished). Assuming an 8 bit (1 byte) ISA agent, the entire system is consumed for approximately 4 microseconds while individual byte approximately segments are sequentially transferred (time index D to time index E) from the ISA data bus to the PCI data bus. The PCI bus is therefore bottlenecked at the ISA speed (8 MHz) and data transfer capability, and is precluded from making use of its higher speed and better transfer capability. Between time index E and time index F the ISA agent having completed its DWord (32-bit) size transaction stream, de-asserts DREQ triggering deassertion of DACK# which releases the ISA bus. From the time index E to time index F period and after the deassertion of DACK#, the expansion bus bridge deasserts PHOLD# triggering deassertion of PHLDA# to release the PCI bus and re-enables the CPU posting buffer. This is the "active release" semantic described earlier wherein the entire system resumes normal operation.

2. Passive Release Implemented ISA DMA Write Sequence

Figure 3:
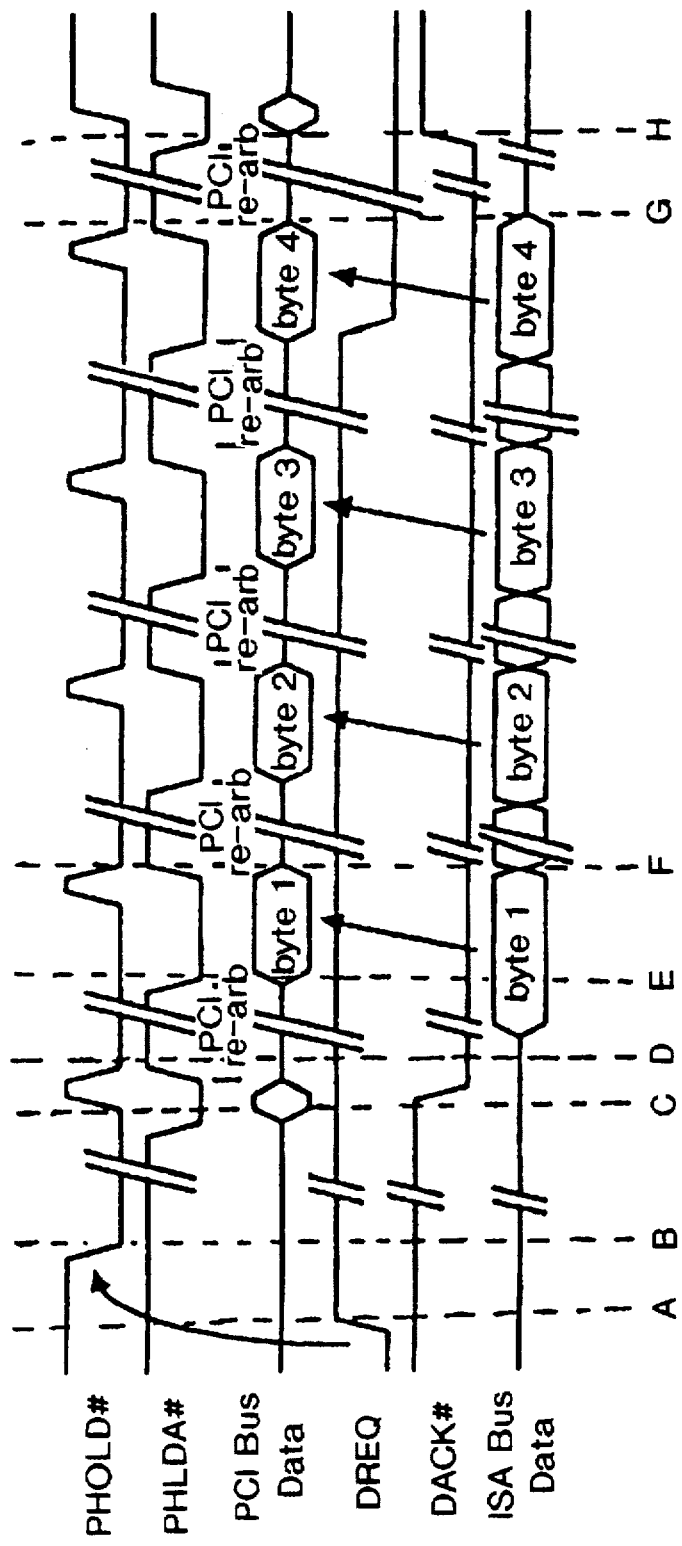
FIG. 3 shows a signal diagram of a passive release implemented system, but without CAT mode buffering.

FIG. 3 shows a signal diagram of a passive release implemented system, but without CAT mode buffering.

The ISA agent asserts a DREQ to the ISA arbiter (time index A) and upon such assertion PHOLD# is asserted by the expansion bus bridge and becomes active low (time index B). Upon winning PCI arbitration, PHLDA# is asserted leading to the assertion of ISA agent 110's DACK#. Note that PHLDA# is asserted only following the acquisition of the host bus, memory bus and emptying and disabling of the CPU posting buffer (time index C to D). In the passive release case, PHOLD# is deasserted and then becomes inactive for a single PCI clock cycle (time index C to D). This passive release semantic frees the PCI, host and memory buses and ensures that the CPU posting buffer has been drained and disabled from further posting. At time index D, PHOLD# is again asserted active low and an ISA cycle begins in order to read the first one-byte segment of data from the ISA agent. Between time index D and E, PCI arbitration ("PCI re-arb") begins anew and when the expansion bus bridge wins PCI arbitration, and the ISA bus is ready to transfer the one-byte segment to the PCI bus (time index E), the one-byte segment of data is written across the PCI bus and on to memory (time index E to F). Immediately following the transfer of the one-byte segment over the PCI bus, a passive release semantic is once again issued which frees up the PCI, host and memory buses for other operations (time index F). The forwarding of one-byte segments followed by a passive release semantic which renews PCI arbitration continues until all four one-byte segments have been transferred across the PCI bus to memory. When all four bytes have been transferred and the ISA DMA transaction is completed as indicated by ISA Agent 110 deasserting its DREQ. DACK# is deasserted upon winning PCI rearbitration (time index H). After winning PCI arbitration, an active release semantic is signaled by the deassertion of PHOLD# for a minimum of two consecutive PCI clock cycles (time index G to H). This active release semantic releases all of the buses and reenables writes to the CPU posting buffer.

3. FDMA Buffering ISA DMA Write Sequence

Figure 4:
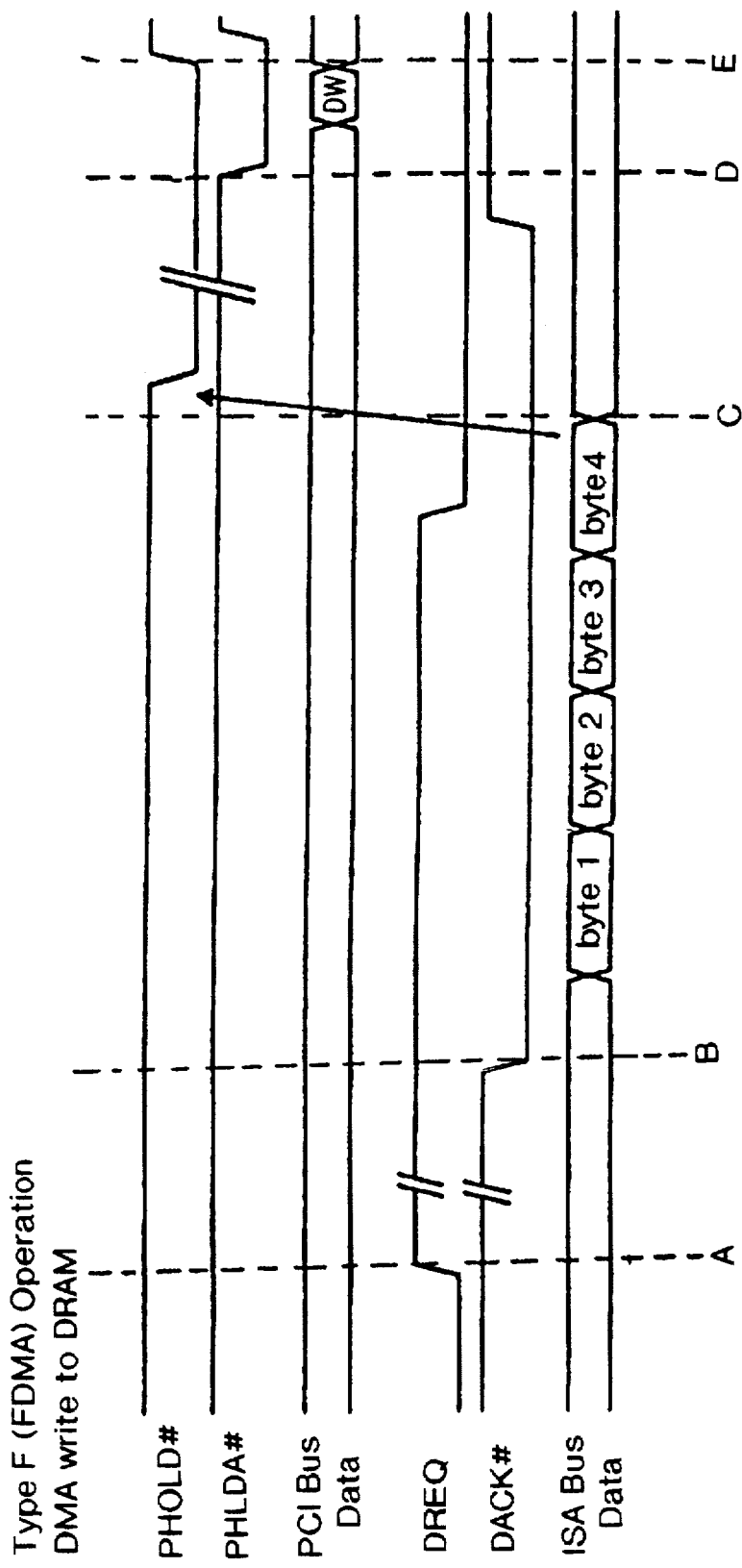
FIG. 4 shows a signal diagram of a FDMA buffering implemented write sequence.

FIG. 4 shows Type-F DMA or FDMA buffering implemented ISA DMA write to DRAM. The ISA agent asserts a DREQ to the ISA arbiter (time index A) and upon the ISA agent winning arbitration, a DACK# is immediately asserted (time index B).

The four one-byte segments are written to the FDMA buffer and since no PHOLD# or PHLDA# has yet been asserted, other system resources such as the PCI bus are freed for other transactions. On the fourth byte segment, the FDMA buffer becomes full and requests arbitration for PCI bus ownership by asserting PHOLD# (time index C). Once the expansion bus bridge is granted access, PHLDA# is asserted (time index E), consuming the entire system, while the 32 bit DWORD (all 4 bytes) is written across the PCI bus at full speed. At time index F, the system returns to a completely free state.

4. CAT Mode ISA DMA Write Sequence

Figure 5:
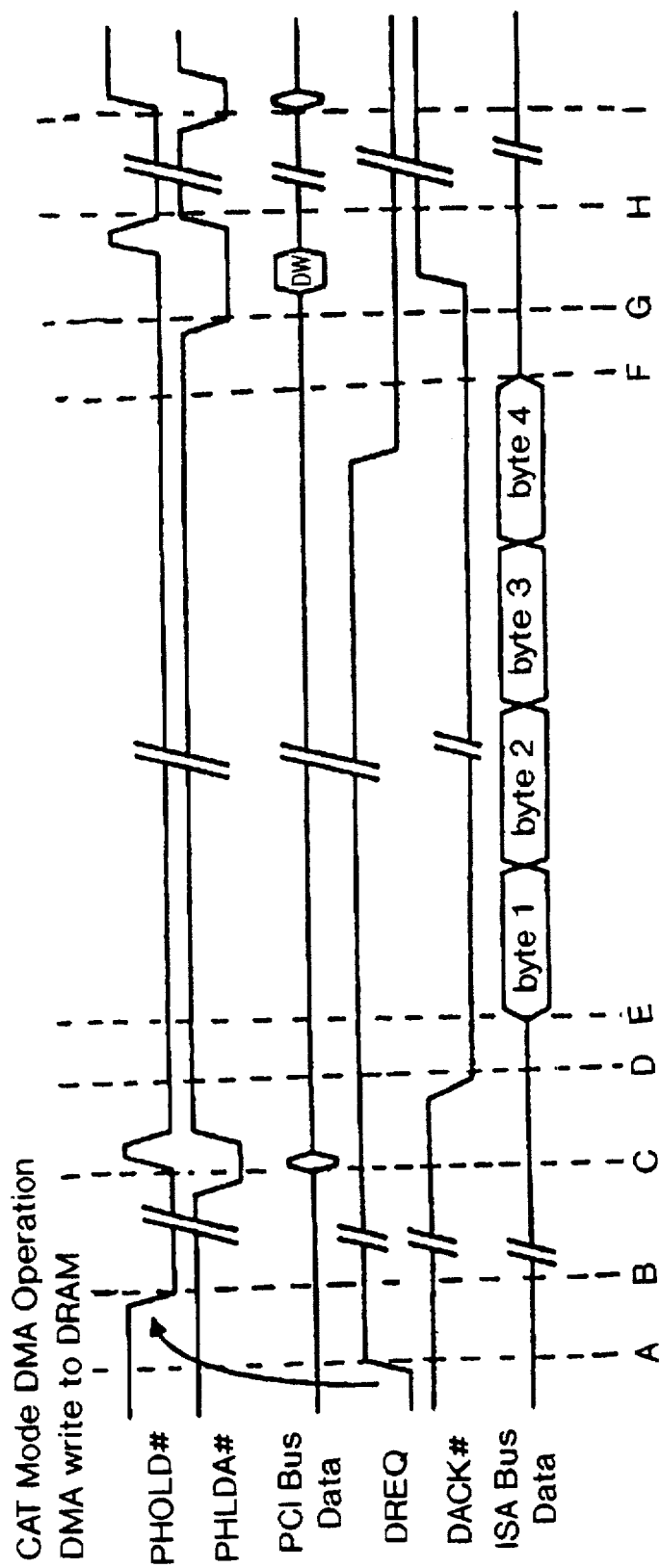
FIG. 5 shows a signal diagram of a passive release and CAT mode buffering implemented write sequence.

FIG. 5 shows a signal diagram of passive release and CAT mode buffering according to the present invention.

The ISA agent asserts a DREQ to the ISA arbiter (time index A) and upon the assertion of DREQ, PHOLD# is asserted immediately (time index B). When the expansion bus bridge wins PCI arbitration, PHLDA# is asserted following the acquisition of the PCI bus, the host bus, memory bus and upon the draining of and disabling of writing to a CPU posting buffer (time index C). As with passive release, the assertion of PHLDA# is immediately followed by signaling a passive release semantic wherein PHOLD# is asserted and becomes inactive for a single PCI clock cycle (between time index C and D). The passive release semantic frees the previously acquired PCI, host and memory buses and prevents additional posting to the CPU posting buffer after it has been drained. After the passive release semantic, the DACK# signal is asserted to the ISA DMA agent (time index D). The ISA agent now begins transferring each one-byte segment consecutively across to the expansion bus bridge and into the CAT mode collection buffer (time index E to F). Once the last byte of the ISA transaction stream, in this case byte four, has been collected in the buffer and the buffer is full (time index F), the buffer in turn is ready to be written across the PCI bus to memory, when the expansion bus bridge gains access to the PCI bus through PCI arbitration (time index F to G). If the PCI acquisition occurred prior to the complete filling of the CAT mode collection buffer, then consecutive passive release semantics would be issued providing time for the CAT mode buffer to become full. Once the PCI bus has been acquired by the expansion bus bridge and the CAT mode collection buffer is full, the entire contents of the buffer, all 32 bits, are written across the PCI bus to memory in a single transaction (time index G to H) at PCI bus speed. Note that to acquire the PCI bus for emptying the cat mode collection buffer PHLDA# is asserted in time index G to H. In this example, where the ISA transaction data stream is only 32 bits, the ISA transaction data stream is completed upon the emptying of the CAT mode collection buffer. With the ISA transaction data stream completed, as indicated by DREQ being deasserted and data emptied from the CAT buffer upon winning PCI arbitration (index I), PHOLD# is deasserted (time index I) for a minimum of two consecutive PCI clock cycles which signals an active release semantic releasing all of the buses in the system and re-enabling posting to the CPU posting buffer.

5. AT compatible ISA DMA Read Sequence

Figure 6:
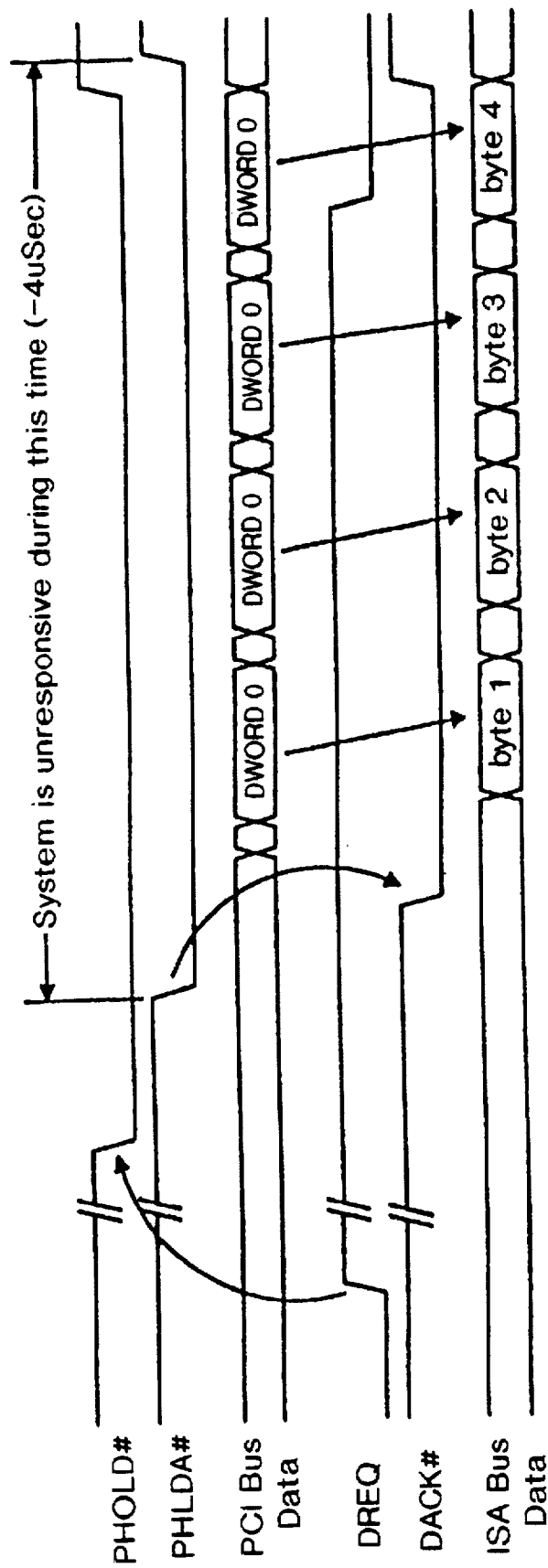
FIG. 6 shows a signal diagram of an ordinary "AT" compatible read sequence.

FIG. 6 shows the case of a read from DRAM to write to an ISA agent in the AT compatible case. The operation is identical to the write to DRAM case of FIG. 2 except that upon assertion of DACK#, a single DWORD is read from DRAM over the PCI bus and written to the ISA agent over the ISA bus. Since the ISA bus, in this example, is capable of only 8-bit (1 byte) transfers on a given ISA bus cycle, the DWORD is read in four one-byte segments and suffers the identical problem as with the DMA write case shown in FIG. 2. Further, when the access is DWord aligned, to obtain each byte, the same DWord is re-read for each segment the ISA bus obtains.

6. Passive Release Implemented ISA DMA Read Sequence

Figure 7:
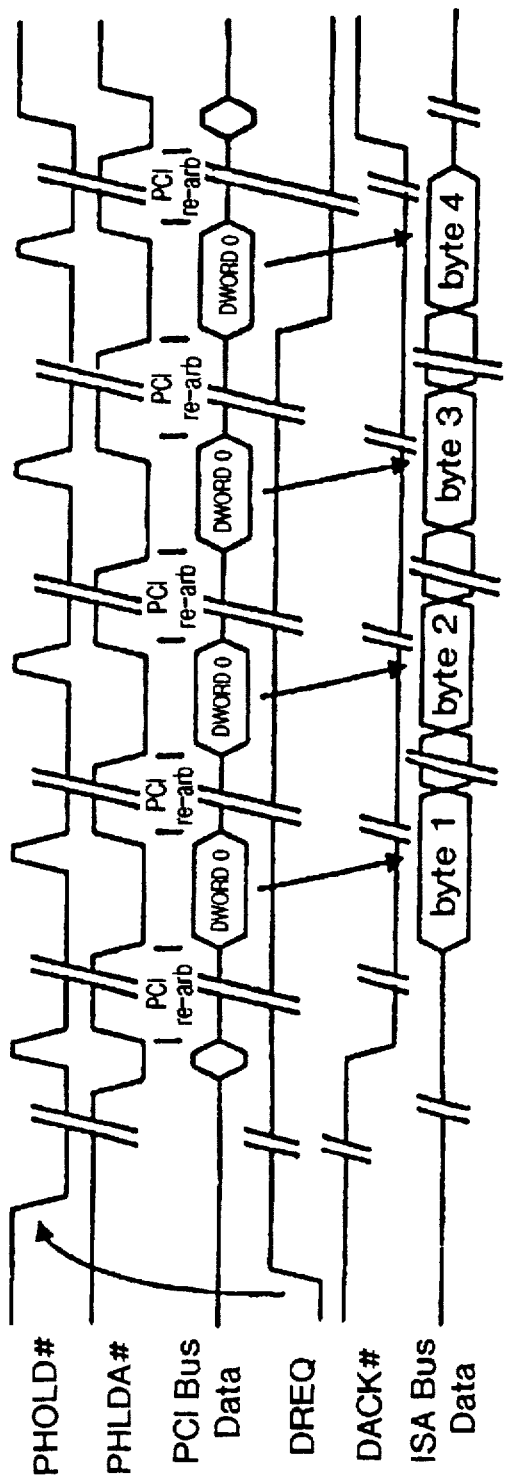
FIG. 7 shows a signal diagram of a passive release implemented read sequence.

FIG. 7 shows a Passive Release Implemented ISA DMA Read sequence from DRAM. Its operation is identical to the passive release implemented ISA DMA write case except that upon the assertion of DACK# and after winning PCI re-arbitration, the entire DWORD is read four times, once for each of the four bytes to be written to the ISA agent and read from memory (in a DWORD aligned case). The passive release and PCI "re-arb" after the reading of each byte repeats, until all bytes in the ISA stream, in this case four bytes, have been read.

7. FDMA Buffering ISA DMA Read Sequence

Figure 8:
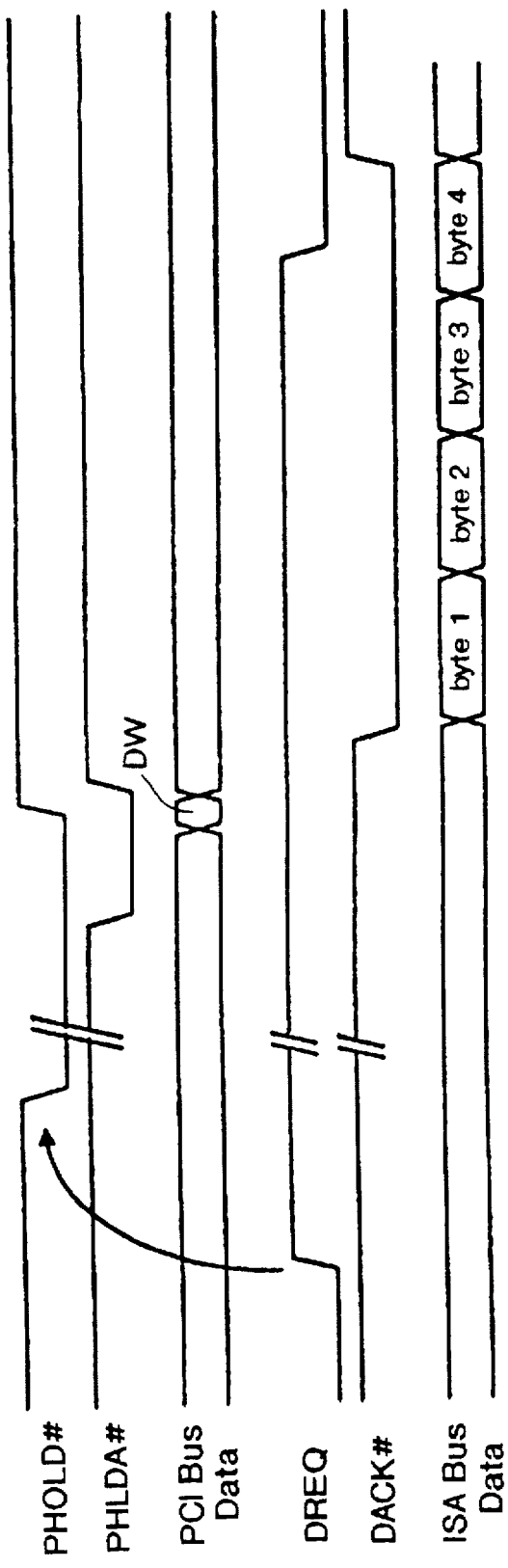
FIG. 8 shows a signal diagram of FDMA buffer implemented read sequence.

FIG. 8 shows Type-F DMA or FDMA buffering implemented ISA DMA read from DRAM. The ISA agent asserts a DREQ to the ISA arbiter and PHOLD# is asserted to request PCI arbitration. When the expansion bus bridge wins PCI arbitration, a single 32-bit (4-byte) DWORD is read from DRAM and written across the PCI bus to the FDMA buffer. Once the DWORD is written, a DACK# is asserted to the ISA agent. Four ISA timed 8-bit data reads are performed on the FDMA collection buffer streaming the data down the ISA bus to the ISA agent. Since PHOLD# and PHLDA# is deasserted once the DWORD is written from DRAM to the collection buffer, other system resources are free during the ISA transaction stream.

8. CAT Mode ISA DMA Read Sequence

Figure 9:
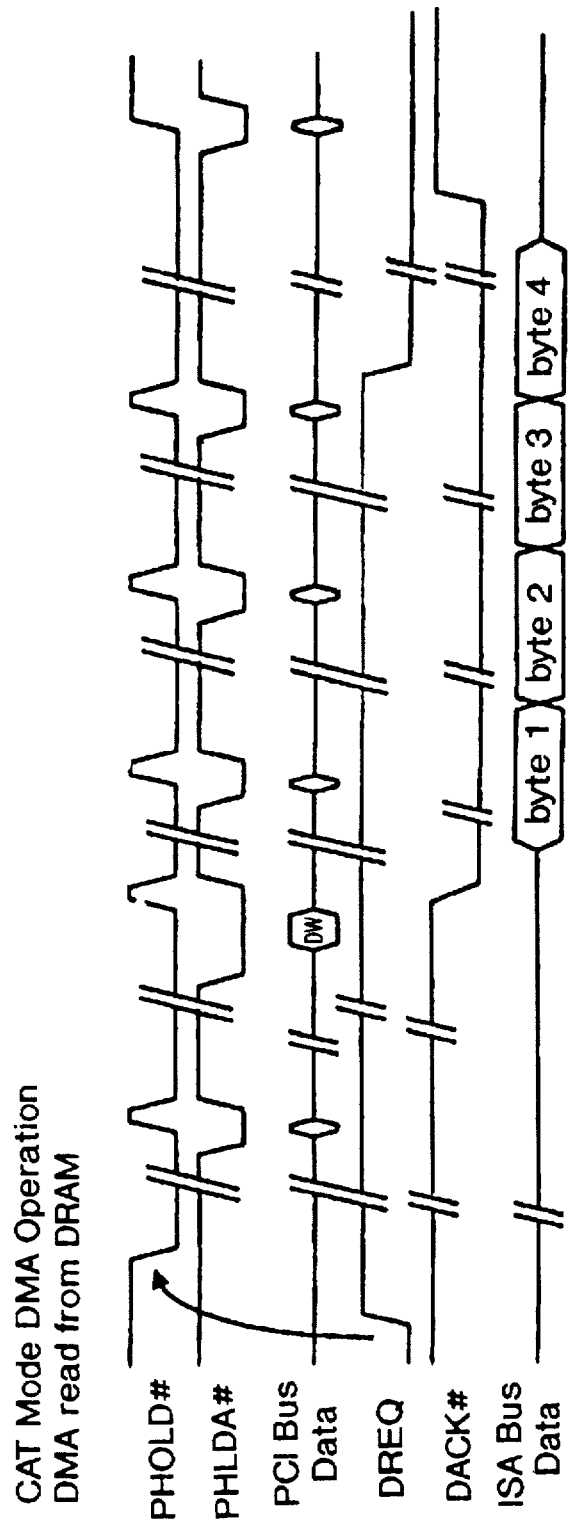
FIG. 9 shows a signal diagram of a passive release and CAT mode buffering implemented read sequence.

FIG. 9 shows the CAT Mode ISA DMA Read sequence. Its operation is identical to the CAT Mode ISA DMA Write Sequence except that when the expansion bus bridge wins PCI arbitration a read from DRAM transfers the entire DWORD (all 32 bits) into the CAT Mode Collection Buffer. Also, in the Read case, the contents of the CAT Mode Collection are written one byte at a time across the ISA bus to the ISA DMA agent. Though the memory, host and PCI buses are all free during the writes to the ISA DMA agent, the CPU posting buffer is drained and remains disabled until the entire ISA transaction is read into the ISA DMA agent. As with the Write case, passive release semantics may be issued to allow the CAT mode collection buffer to empty in case it cannot do so prior to the current PCI acquisition. An active release semantic, once the transaction is complete, is also signaled as with the write case.

C. Timing and Data Utilization

Figure 10:
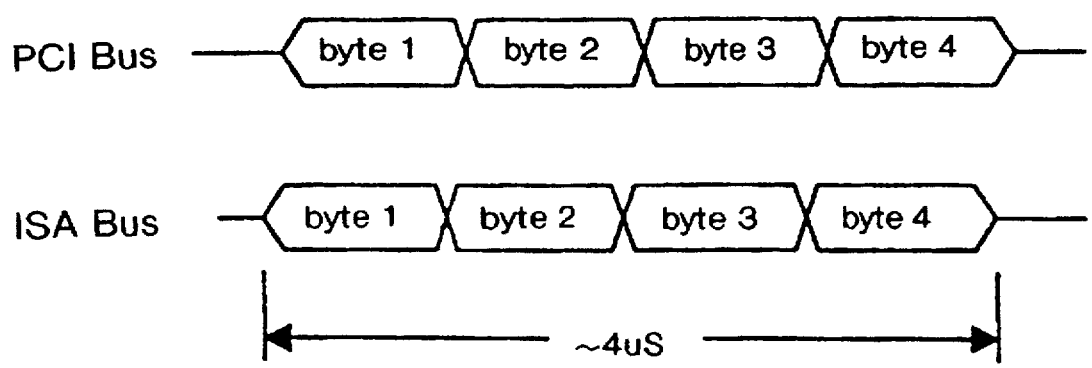
FIG. 10 shows the timing and data utilization of an ordinary "A" compatible ISA DMA transfer.

FIG. 10 shows the timing and data utilization of ordinary "AT" compatible ISA DMA transfers. In an ISA transaction on an ordinary "AT" transferring 4 bytes (32 bits) to DRAM, each byte is transferred one right after the other and simultaneously written to the PCI bus. Thus, though the PCI bus and memory bus may be capable of 33 MHz or higher speed, they must operate at the speed of the ISA bus which is usually 8 MHz, and are bottlenecked. On an ISA bus, each data transaction usually takes approximately one microsecond, and thus for the entire 4-byte transfer, the PCI bus and host bus are consumed and for about 4 microseconds (~one microsecond for each byte times 4 bytes). Further, other agents are not allowed to transact during those 4 microseconds, so the system is otherwise unresponsive during this time.

Figure 11:
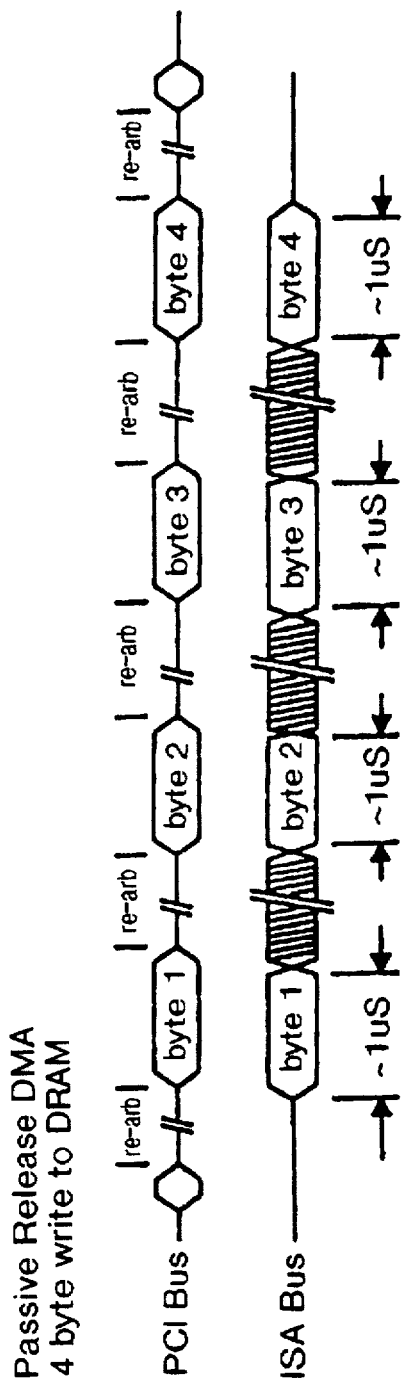
FIG. 11 shows the timing and data utilization of a passive release ISA DMA transfer.

FIG. 11 shows the timing and data utilization of a passive release ISA Direct Memory Access (DMA) transfer. The 4-byte transaction is partitioned into 1-byte units (one byte because the ISA agent is an 8-bit device). During the "re-arb" (re-arbitration) time between each byte transaction, other agents can utilize the system thereby improving the responsiveness of the system to multitasking operations. Thus, a data read/write to a disk is allowed to occur during the period of time when re-arbitration occurs. However, with the passive release system, the 32 bit PCI bus underachieves in that it still only transfers one byte across the PCI bus at a given time at ISA speed (8 MHz). Further, though the PCI bus, host bus and DRAM are freed during the "re-arb" time to accommodate transactions by agents other than the ISA agent, the total time components are locked is still 4 microseconds.

Figure 12:
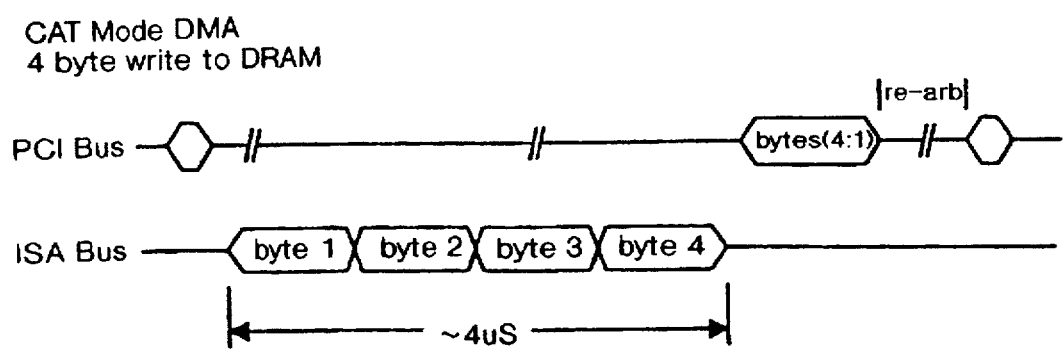
FIG. 12 shows the timing and data utilization of a CAT buffering ISA DMA transfer according to the present invention.

FIG. 12 shows the timing and data utilization of a CAT mode buffer implemented ISA DMA transaction according to the present invention. While the ISA transaction is on-going, all of the other system resources are freed (with the exception of the ISA bus) for a 4 microsecond interval during which the ISA agent is writing and filling the CAT mode buffer. When the CAT mode buffer is full, all 4 bytes are written at once over the PCI bus thus making full use of the 32 bit capability of the PCI bus, and the write is performed at PCI bus timing so that the 32 bit Dword is written in approximately 120 nanoseconds. Thus, the utilization of the PCI bus is reduced from 4 microseconds to 120 nanoseconds for the same transaction.

Though the present invention has been described with a PCI and ISA bus and uses an audio example, CAT mode buffered may be implemented in any system with a slow bus and fast bus where devices on the slow bus can consume the rest of the system indefinitely.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a computer system configured to conduct DMA (Direct Memory Access) transactions, said system including a CPU, main memory, a host bus, a pre-emptible bus, non-pre-emptible bus, an agent coupled to the non-pre-emptible bus for transacting a data stream over the non-pre-emptible bus, a collection buffering apparatus comprising:

a bridge coupled between the pre-emptible bus and the non-pre-emptible bus; and a buffer coupled to said bridge for collecting segments of said data stream to form a block wherein said block is written over the pre-emptible bus for use in DMA transactions, wherein said bridge issues a passive release signal releasing the system for transacting data streams other than the data stream of the agent on the non-pre-emptible bus.

2. A collection buffering apparatus according to claim 1 wherein said block is of a size equal to the maximum data transfer width of the pre-emptible bus during a cycle of the pre-emptible bus.

3. A collection buffering apparatus according to claim 1 wherein the pre-emptible bus has a greater maximum data transfer width than the non-pre-emptible bus.

4. A collection buffering apparatus according to claim 1 further comprising a CPU posting buffer for collecting transactions from the CPU to the pre-emptible bus.

5. A collection buffering apparatus according to claim 4 further comprising a system lock-up negotiator to prevent a write to the CPU posting buffer from agents residing on the non-pre-emptible bus during the transacting of the data stream.

6. A collection buffering apparatus according to claim 5 wherein said system lock-up negotiator flushes empty the CPU posting buffer prior to the passive release releasing the system.

7. A collection buffering apparatus according to claim 1 wherein the transacting of data streams by the agent on the non-pre-emptible bus commences only upon a grant by an arbiter for the non-pre-emptible bus.

8. A collection buffering apparatus according to claim 1 wherein said pre-emptible bus is a PCI bus.

9. A collection buffering apparatus according to claim 1 wherein said non-pre-emptible bus is an ISA bus.

10. In a computer system configured to conduct DMA (Direct Memory Access) transactions, said system including a CPU, main memory, a host bus, a pre-emptible bus and a non-pre-emptible bus, a collection buffering method comprising the steps of:

granting an agent on the non-pre-emptible bus apparent use for DMA transactions of the CPU, main memory, host bus and pre-emptible bus;

utilizing the CPU, main memory, host bus and pre-emptible bus for transactions of agents other than said agent on the non-pre-emptible bus;

transacting a data stream in segments of N bits to and from the agent over the non-pre-emptible bus to a collection buffer;

collecting a plurality of said segments of size N bits into a block of size M bits in the collection buffer; and writing said block of size M bits in a single transaction over the pre-emptible bus for actual DMA transaction use of one of said CPU, main memory, host bus and pre-emptible bus, wherein said collecting and said writing repeatedly continues until the data stream is completed.

11. A collection buffering method according to claim 10 wherein M is a size equal to a maximum data transfer width of the pre-emptible bus.

12. A collection buffering method according to claim 10 wherein the step of granting the agent further comprises the step of preventing a system lock-up condition in a CPU posting buffer coupled the pre-emptible bus.

13. A collection buffering method according to claim 12 wherein said step of preventing a system lock-up includes flushing the CPU posting buffer prior to commencement of the data stream transaction.

14. A collection buffering method according to claim 13 wherein said step of preventing system lock-up further includes preventing the CPU posting buffer from being written to during the non-pre-emptible bus data stream transaction.

15. A collection buffering method according to claim 10 further comprising the step of signaling a passive release to the CPU, main memory, host bus and pre-emptible bus prior to the transacting data of size N bits.

16. A collection buffering method according to claim 10 wherein the step of writing occurs only after the collection buffer has been filled to a maximum capacity.

17. A collection buffering method according to claim 10 further comprising the step of signaling an active release to the CPU, main memory, host bus and pre-emptible bus immediately upon completion of the data stream transaction.

18. A collection buffering method according to claim 10 wherein the step of utilizing is performed without informing the agent of the non-pre-emptible bus of the utilization.

* * * * *